(No Model.)
A. B. SPARROW.
BAKING PAN.
No. 335,251. Patented Feb. 2, 1886.
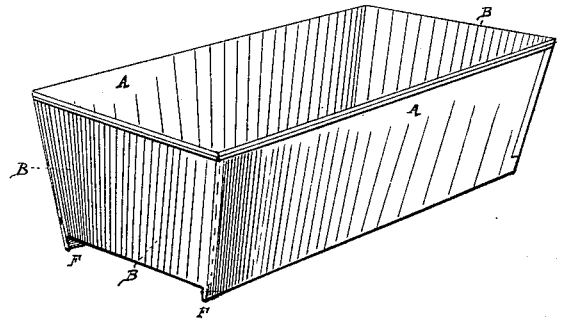
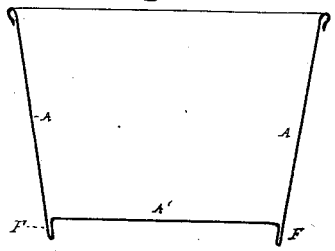
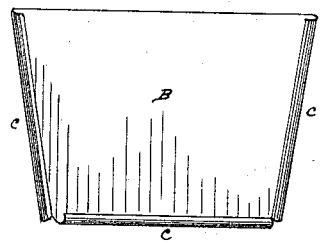
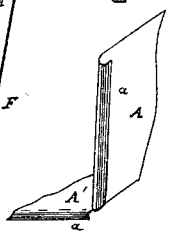
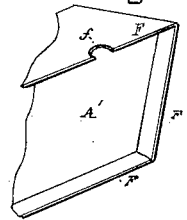
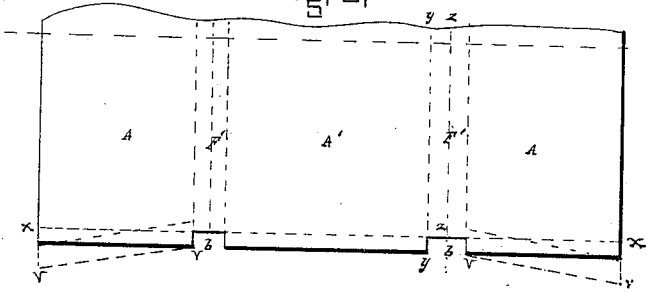
WITNESSES,
W. G. Button
H. E. Barry
INVENTOR,
Alphonso B Sparrow
by Wm. B. H. Dowse
Atty.

UNITED STATES PATENT OFFICE.

ALPHONSO B. SPARROW, OF MALDEN, ASSIGNOR OF ONE-HALF TO GEORGE A. RUSSELL, OF NEWTON, MASSACHUSETTS.

BAKING-PAN.

SPECIFICATION forming part of Letters Patent No. 335,251, dated February 2, 1886.

Application filed April 22, 1885. Serial No. 163,015. (No model.)

*To all whom it may concern:*

Be it known that I, ALPHONSO B. SPARROW, a citizen of the United States, residing at Malden, county of Middlesex, and Commonwealth of Massachusetts, have invented certain new and useful Improvements in Baking-Pans, of which the following is a full, clear, concise, and exact description, reference being had to the drawings, forming a part of this specification.

Baking-pans as usually constructed have the serious fault of burning or overbaking their contents on the bottom. I am aware that pans have been devised to avoid this fault by adding to the bottom flanges, feet, or supports, and in other ways; but the object of my invention is to produce an improved baking-pan of very strong and simple construction that will not, in the process of baking, burn the bread or other dough on the bottom, and that will bake it uniformly.

An important feature of my pan is its simplicity, consisting, as it does, of but three pieces, and having the supports integral with the sides and bottom of the pan. To this end I have devised a pan in which two of the sides are continuous with the bottom, the two ends being seamed in, in any convenient manner. I fold the strip forming the sides and bottom so as to form legs or supports projecting downward, upon which the pan rests, leaving an air-space between it and the oven-bottom. The ends might also be extended downward, but there would be no advantage in doing so, and they would impede the air circulation.

In the drawings, Figure 1 is a perspective view of an oblong baking-ban with sloping sides, such as is usually employed for baking bread, constructed in accordance with my invention. The pan is shown oblong and with sloping sides; but it may be of any size or rectangular shape, these details being merely a matter of convenience. Fig. 2 is a vertical cross-section of pan. Fig. 3 is a view of one of the end pieces of the pan with flanges for forming seams bent up ready for slipping on the end of the side and bottom piece of pan. Fig. 4 is a perspective view of one end of side and bottom piece, showing flanges for forming seams for securing end pieces. Fig. 5 is a perspective view of a portion of the bottom of a pan provided with flanges on all four sides, any number of notches, $f$, being made to permit air circulation. Fig. 6 is a plan view of one-half of the sheet which forms the bottom and sides of a vertical-sided pan as it looks just stamped out.

The dotted lines $v\ v$ indicate the shape of end of sheet when cut for sloping-sided pans, such as are shown in Fig. 1.

A represents the longer sides of the pan; A', bottom of pan; B, ends of pan; F, supports of pan; C, the flanges on end pieces for seaming to sides and bottom of pan; $a$, flanges on ends of the integral side and bottom plate, A A'; $b$, notch cut in sheet A A', between portions forming flanges at one end for seaming; F', portions of sheet forming supports; $f$, notch cut in supports when used on all four sides; X X, line of bend for flanges at end of side and bottom sheet A A' for seaming; Y Y, line of bend for supports.

The way in which my improved baking-pan may be constructed is as follows: Take a sheet of tin or iron of the proper size and cut it out, as indicated in Fig. 6, both cuts being the same, then bend the sheet downward on the line Y Y at right angles to the plane of the central portion of the sheet which forms the bottom of the pan.

The advantages of this baking-pan, in common with others having two supports to raise them above the bottom of the oven, are that the bread is baked uniformly, because the bottom of the pan receives no heat by conduction from the oven-bottom, but only by radiation and convection, just as the sides and top are heated. The open ends allow the hot air to circulate more freely.

The peculiar advantages in my pan are principally constructive, consisting in its simplicity, ease of manufacture, and strength.

The height of the supports will vary according to the purpose for which the pan is to be used; but in ordinary pans for bread and cake the height should be from one-quarter to one-half an inch.

Having now fully described my invention, what I claim, and desire to secure by Letters Patent, is—

1. A baking-pan constructed of three pieces of sheet metal, the bottom, two of the sides, and the supports being of one integral piece, and the other two sides being seamed thereto, substantially as shown.

2. A baking-pan constructed of the end pieces, B B, and the side-and-bottom sheet, A, provided with the supports F F, formed by a fold in the sheet A, projecting below the bottom A' of the pan, substantially as described.

In witness whereof I have hereunto set my hand.

ALPHONSO B. SPARROW.

Witnesses:
WM. B. H. DOWSE,
W. G. BUTTON.